United States Patent
Kai et al.

(10) Patent No.: US 7,054,087 B2
(45) Date of Patent: May 30, 2006

(54) MAGNETIC RECORDING-REPRODUCING APPARATUS

(75) Inventors: Tadashi Kai, Kawasaki (JP); Akira Kikitsu, Yokohama (JP); Toshihiko Nagase, Kawasaki (JP); Tomoyuki Maeda, Yokohama (JP); Junichi Akiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/944,882

(22) Filed: Sep. 21, 2004

(65) Prior Publication Data

US 2005/0036225 A1    Feb. 17, 2005

Related U.S. Application Data

(63) Continuation of application No. 10/236,931, filed on Sep. 9, 2002.

(30) Foreign Application Priority Data

Sep. 17, 2001 (JP) .............................. 2001-281607

(51) Int. Cl.
*G11B 5/02* (2006.01)
*G11B 5/66* (2006.01)

(52) U.S. Cl. .................. 360/59; 428/820.4; 428/820.5

(58) Field of Classification Search .................. None
See application file for complete search history.

(56) References Cited

U.S. PATENT DOCUMENTS

| | | | |
|---|---|---|---|
| 5,030,512 A | | 7/1991 | Kato et al. |
| 5,723,978 A | * | 3/1998 | Inomata et al. ............ 324/235 |
| 6,128,166 A | | 10/2000 | Tanaka et al. |
| 6,143,436 A | | 11/2000 | Nakajima et al. |
| 2002/0191320 A1 | * | 12/2002 | Coffey et al. ................ 360/59 |
| 2003/0049493 A1 | * | 3/2003 | Naoe et al. ............ 428/694 BS |

FOREIGN PATENT DOCUMENTS

| | | | |
|---|---|---|---|
| JP | 05174436 A | * | 7/1993 |
| JP | 11-203740 | | 7/1999 |

* cited by examiner

*Primary Examiner*—David Hudspeth
*Assistant Examiner*—Daniell L. Negrón
(74) *Attorney, Agent, or Firm*—Finnegan, Henderson, Farabow, Garrett & Dunner, L.L.P.

(57) ABSTRACT

A magnetic recording-reproducing apparatus has a magnetic recording medium having a nonmagnetic substrate, and a functional layer and a recording layer formed on the nonmagnetic substrate, the recording layer exhibiting a magnetic anisotropy energy density $Ku_{RL}$, the functional layer developing ferromagnetism upon irradiation with light so as to exhibit a magnetic anisotropy energy density $Ku_{FL}$ lower than the magnetic anisotropy energy density $Ku_{RL}$ and the functional layer serving to lower the magnetic anisotropy energy density of the recording layer through exchange coupling interaction with the recording layer when the functional layer is irradiated with light, a light source which irradiates the functional layer with light, and a magnetic head having a writing head writing signal magnetization by applying a magnetic field to the recording layer and a reading head reading the signal magnetization recorded in the recording layer.

14 Claims, 5 Drawing Sheets

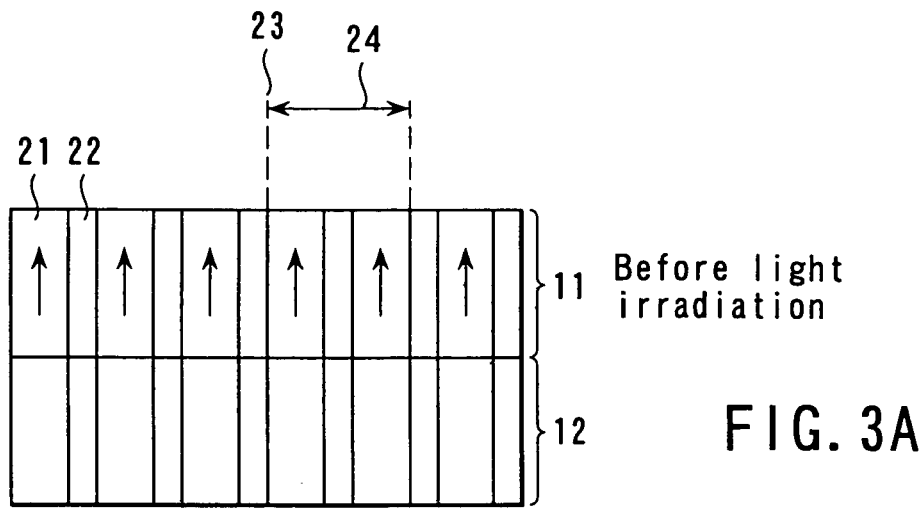
FIG. 3A Before light irradiation
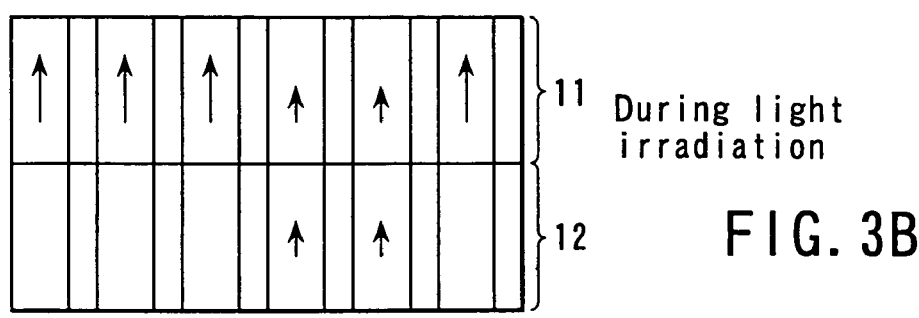
FIG. 3B During light irradiation
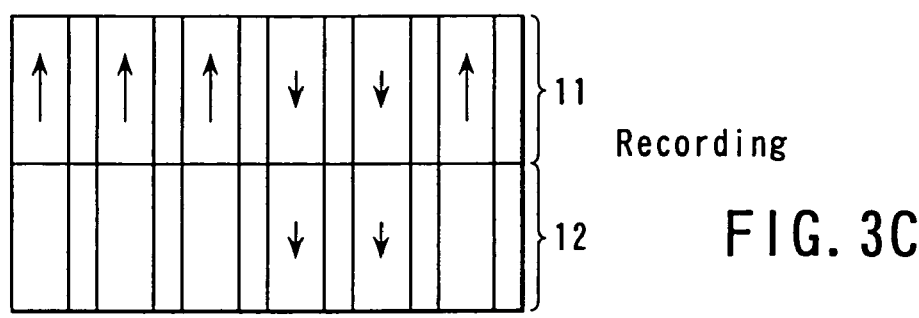
FIG. 3C Recording
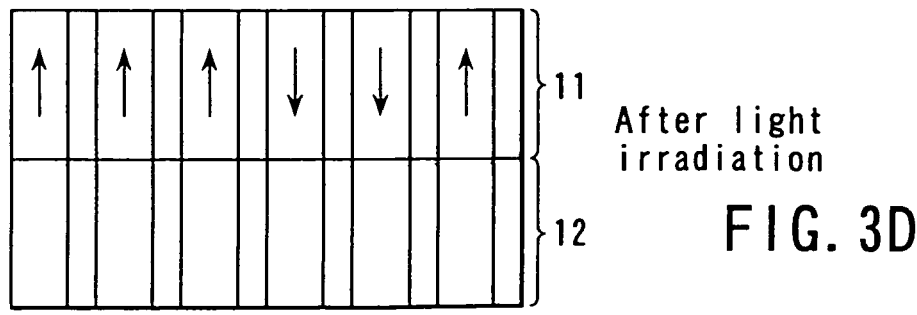
FIG. 3D After light irradiation

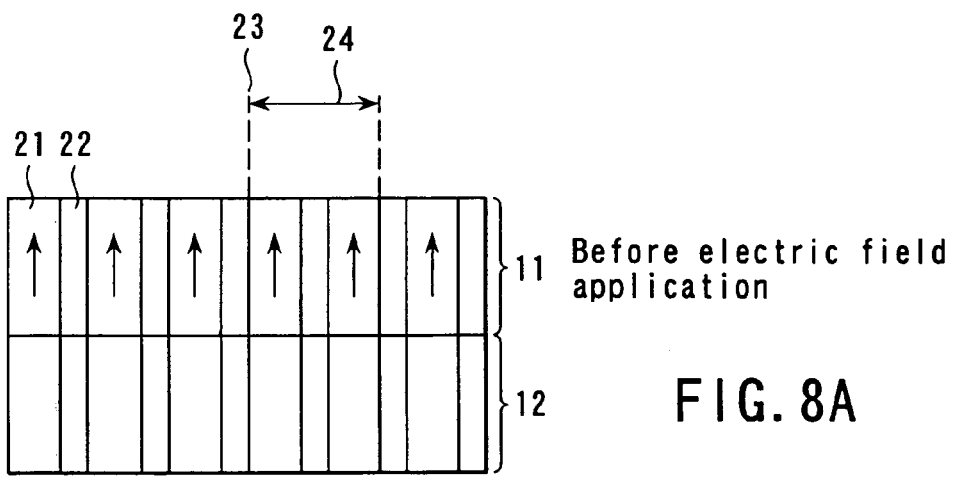
FIG. 8A Before electric field application
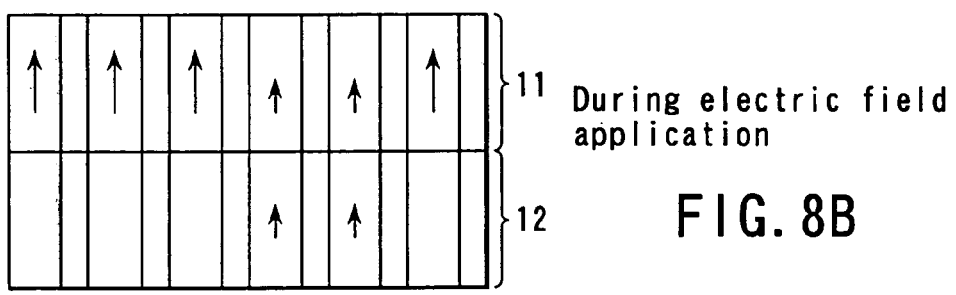
FIG. 8B During electric field application
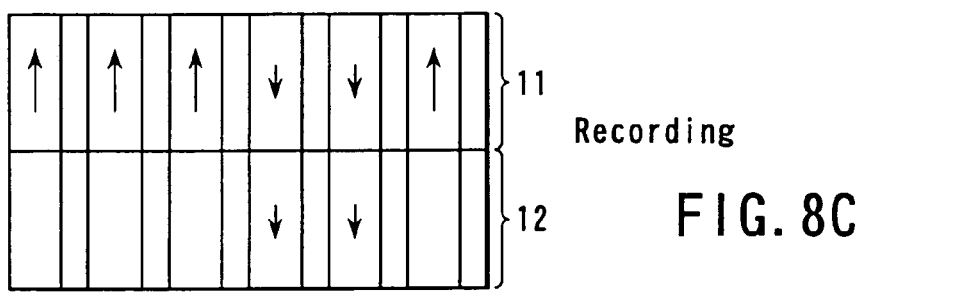
FIG. 8C Recording
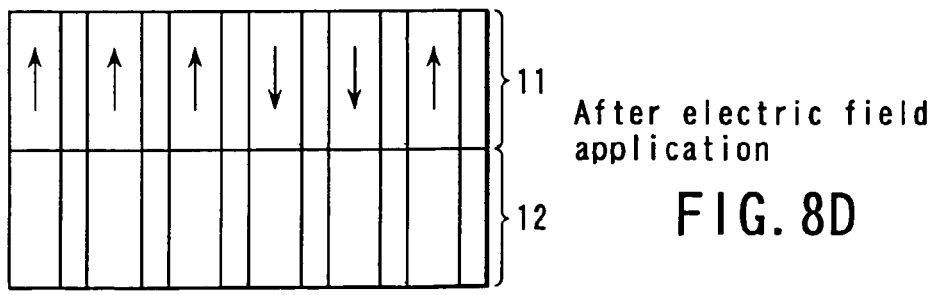
FIG. 8D After electric field application

MAGNETIC RECORDING-REPRODUCING APPARATUS

CROSS-REFERENCE TO RELATED APPLICATIONS

This application is a continuation of application Ser. No. 10/236,931, filed Sep. 9, 2002, which is incorporated herein in its entirety by reference. This application is also based upon and claims priority from prior Japanese Patent Application No. 2001-281607, filed Sep. 17, 2001, the entire contents of which are incorporated herein by reference.

BACKGROUND OF THE INVENTION

1. Field of the Invention

The present invention relates to a magnetic recording-reproducing apparatus.

2. Description of the Related Art

With improvement in the processing speed of an electronic computer achieved in recent years, further improvements in the operating speed and in the information storing density continue to be required for a magnetic memory apparatus (HDD) performing the information storing function and the information reproducing function. However, it is said that there is a physical limit in the further improvement in the information storing density, and whether the requirement noted above continues to be satisfied is said to be questionable.

The magnetic recording medium included in the HDD comprises as a recording layer a magnetic layer formed of an aggregate of fine magnetic particles. In order to achieve a high-density recording in such a magnetic recording medium, it is desirable for the magnetic domains recorded in the magnetic layer to be small. In order to allow the small recording domains to be distinguishable, it is necessary for the boundaries of the domains to be smooth. For this purpose, it is necessary to make magnetic particles as small as possible. It should also be noted that, linkage of magnetization transition between the adjacent magnetic particles causes disturbance in the boundaries between the adjacent domains. Therefore, it is necessary to arrange a nonmagnetic material between the adjacent magnetic particles so as to magnetically separate the magnetic particles and, thus, to prevent exchange coupling interaction from being exerted between the adjacent magnetic particles.

Also, in order to read magnetic information recorded in the magnetic recording medium, it is necessary to enhance interaction between the magnetic head of the HDD and the magnetic layer of the magnetic recording medium. For enhancing the interaction noted above, it is also necessary to decrease the thickness of the magnetic layer included in the magnetic recording medium.

Under the circumstances, it is necessary to decrease the volume of the magnetization reversal unit, which is substantially equal to the volume of the magnetic particle, of the magnetic material constituting the magnetic layer of the magnetic recording medium.

It should be noted, however, that, if the magnetization reversal unit is miniaturized, the magnetic anisotropy energy of the unit, which is equal to the product of the magnetic anisotropy energy density Ku and the volume V of the magnetization reversal unit, is rendered smaller than the thermal fluctuation energy, resulting in failure to maintain the domains. This is called a thermal fluctuation phenomenon. Also, the physical limit of the recording density that is caused mainly by the thermal fluctuation phenomenon is called a thermal fluctuation limit.

In order to prevent the magnetization reversal caused by the thermal fluctuation, it is conceivable to make the magnetic anisotropy energy of the magnetic layer higher than the thermal fluctuation energy. However, if the magnetic anisotropy energy of the magnetic layer is increased, the coercivity of the magnetic layer, which is substantially proportional to the magnetic anisotropy energy, is also increased so as to give rise to the problem that recording cannot be performed under the magnetic field that can be produced by a writing head available nowadays.

As described above, the prior art is defective in that, even if the magnetization reversal unit is miniaturized for performing a high-density recording, the recording density is limited by the thermal fluctuation limit. On the other hand, if a magnetic material having high magnetic anisotropy energy is used for forming the recording layer in order to prevent the magnetization reversal caused by the thermal fluctuation, the coercivity is rendered excessively high so as to give rise to the problem that the recording cannot be performed under the magnetic field that can be produced by the writing head available nowadays.

BRIEF SUMMARY OF THE INVENTION

An object of the present invention is to provide a magnetic recording-reproducing apparatus capable of performing recording by using a writing head available nowadays even in the case of using a magnetic material having high magnetic anisotropy energy.

According to one aspect of the present invention, there is provided a magnetic recording-reproducing apparatus, comprising: a magnetic recording medium comprising a nonmagnetic substrate, and a functional layer and a recording layer formed on the nonmagnetic substrate, the recording layer exhibiting a magnetic anisotropy energy density $Ku_{RL}$, the functional layer developing ferromagnetism upon irradiation with light so as to exhibit a magnetic anisotropy energy density $Ku_{FL}$ lower than the magnetic anisotropy energy density $Ku_{RL}$ and the functional layer serving to lower the magnetic anisotropy energy density of the recording layer through exchange coupling interaction with the recording layer when the functional layer is irradiated with light; a light source which irradiates the functional layer with light; and a magnetic head comprising a writing head writing signal magnetization by applying a magnetic field to the recording layer and a reading head reading the signal magnetization recorded in the recording layer.

According to another aspect of the present invention, there is provided a magnetic recording-reproducing apparatus, comprising: a magnetic recording medium comprising a nonmagnetic substrate, and a functional layer and a recording layer formed on the nonmagnetic substrate, the recording layer exhibiting a magnetic anisotropy energy density $Ku_{RL}$, the functional layer developing ferromagnetism upon application of an electric field so as to exhibit a magnetic anisotropy energy density $Ku_{FL}$ lower than the magnetic anisotropy energy density $Ku_{RL}$, and the functional layer serving to lower the magnetic anisotropy energy density of the recording layer through exchange coupling interaction with the recording layer when an electric field is applied to the functional layer; a probe which applies an electric field to the functional layer; and a magnetic head comprising a writing head writing signal magnetization by applying a magnetic field to the recording layer and a reading head reading the signal magnetization recorded in the recording layer.

BRIEF DESCRIPTION OF THE SEVERAL VIEWS OF THE DRAWING

FIGS. 3A to 3D collectively show the changes in magnetization of the recording layer and the functional layer relative to light irradiation in the magnetic disk apparatus according to one embodiment of the present invention;

FIGS. 8A to 8D collectively show the changes in magnetization of the recording layer and the functional layer relative to electric field application in the magnetic disk apparatus according to another embodiment of the present invention.

DETAILED DESCRIPTION OF THE INVENTION

The principle of the magnetic recording-reproducing apparatus according to the embodiments of the present invention will now be described. In the embodiments of the present invention, used is a recording layer having a high magnetic anisotropy energy density $Ku_{RL}$ (or a high coercivity), which is hard to cause magnetization reversal under a writing magnetic field of a writing head available nowadays. Also, a magnetic semiconductor layer exhibiting light-induced ferromagnetism or field-induced ferromagnetism is stacked to the recording layer. Upon irradiation with light or electric field application, the magnetic semiconductor layer exhibits a magnetic anisotropy energy density $Ku_{FL}$, which is lower than the magnetic anisotropy energy density $Ku_{RL}$, and serves to lower the magnetic anisotropy energy density $Ku_{RL}$ (or coercivity) of the recording layer through exchange coupling interaction with the recording layer. Then, the magnetic anisotropy energy density of the recording layer is made intermediate between $Ku_{RL}$ and $Ku_{FL}$. As a result, writing to the recording layer can be made possible even by the writing head available nowadays. After the recording, the magnetic anisotropy energy density (or coercivity) of the recording layer is brought back to the original value by stopping the light irradiation or the electric field application so as to eliminate the problem of the thermal fluctuation.

Some embodiments of the present invention will now be described with reference to the accompanying drawings.

EMBODIMENT 1

Figure 1:
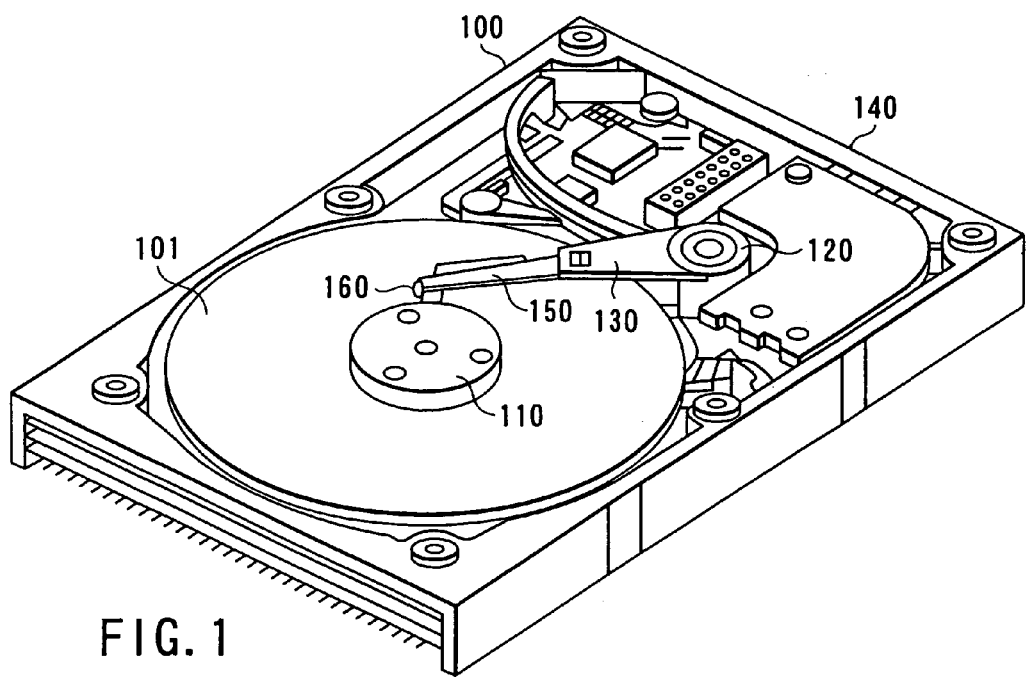
FIG. 1 is a perspective view showing a magnetic disk apparatus according to one embodiment of the present invention.

FIG. 1 is a perspective view showing a construction of a magnetic disk apparatus according to a first embodiment of the present invention.

As shown in FIG. 1, a magnetic disk 101, as a magnetic recording medium, is mounted to a spindle 110 so as to be rotated at a predetermined rotating speed.

An actuator arm 130 is mounted via a ball bearing (not shown) to a shaft 120 arranged in the vicinity of the magnetic disk 101. A bobbin portion for holding a driving coil (not shown) is formed in the proximal end portion of the actuator arm 130. Also, a voice coil motor 140, which is a kind of a linear motor, is arranged around the proximal end portion of the actuator arm 130. The voice coil motor 140 is formed of a magnetic circuit comprising a driving coil (not shown) wound in the bobbin portion of the actuator arm 130, a permanent magnet and a counter yoke arranged to face the permanent magnet, the permanent magnet and the counter yoke being arranged to have the driving coil sandwiched therebetween. The actuator arm 130 can be pivotally rotated by means of the voice coil motor 140.

A thin plate-like suspension 150 is connected to the tip of the actuator arm 130. A head slider 160 is mounted to the tip of the suspension 150. Arranged in the head slider 160 are a writing head writing signal magnetization by applying a magnetic field to the recording layer and a reading head reading the signal magnetization recorded in the recording layer.

The head slider 160 is held in a desired position in a floating or contact state above the magnetic disk 101 by the movement of the actuator arm 130 so as to allow the writing head and the reading head to write to or read from the magnetic information.

As described herein later, it is possible for the head slider 160 to be provided with a light source which irradiates the magnetic disk 101 with light or a probe which applies an electric field to the magnetic disk 101. It is possible to arrange the light source that irradiates the magnetic disk 101 with light or the probe that applies an electric field to the magnetic disk 101 to the back surface of the magnetic disk 101 in a position corresponding to the head slider 160.

Figure 2:
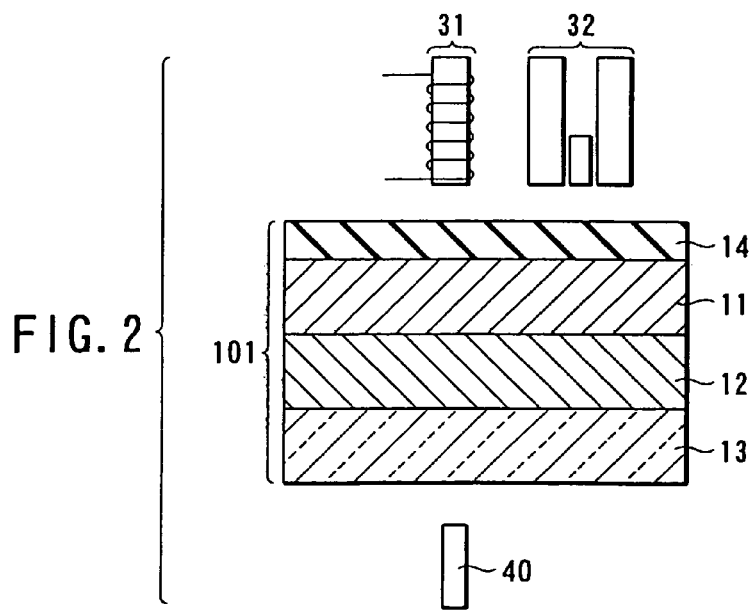
FIG. 2 is a cross sectional view showing an arrangement of the magnetic recording medium, the magnetic head and the laser in the magnetic disk apparatus according to one embodiment of the present invention.

FIG. 2 is a cross sectional view showing the magnetic disk 101 as a magnetic recording medium, the magnetic head and the laser included in the magnetic disk apparatus according to the first embodiment of the present invention.

As shown in FIG. 2, the magnetic disk 101 as a magnetic recording medium includes a nonmagnetic substrate 13, a functional layer 12 formed on the nonmagnetic substrate 13, a recording layer 11 formed on the functional layer 12, and a protective layer 14 formed on the recording layer 11. The stacking order of the functional layer 12 and the recording layer 11 is not particularly limited. It is also possible to form the recording layer 11 on the nonmagnetic substrate 13 and the functional layer 12 on the recording layer 11.

A disk-like hard substrate can be used as the nonmagnetic substrate 13. A nonmagnetic material such as a metal, glass or a ceramics can be used as the material of the nonmagnetic substrate 13.

A light-induced ferromagnetic material that develops ferromagnetism upon irradiation with light is used for forming the functional layer 12. The functional layer 12 under the state that the ferromagnetism is developed has a magnetic anisotropy energy density $Ku_{FL}$. It is possible for the magnetic anisotropy of the functional layer 12 under the state that the ferromagnetism is developed to be any of an in-plane magnetic anisotropy, a perpendicular magnetic anisotropy and a mixed anisotropy thereof.

The light-induced ferromagnetic material used for forming the functional layer 12 includes, for example, a semiconductor material containing In, Ga, Zn, Cd, Si or Ge. To be more specific, the light-induced ferromagnetic material noted above includes a magnetic semiconductor material prepared by adding a transition metal such as Ti, V, Cr, Mn, Fe, Co or Ni to a semiconductor material such as InAs, GaAs, ZnO, ZnSe, or ZnTe.

The thickness of the functional layer 12 is not particularly limited. However, it is undesirable for the thickness of the functional layer 12 to exceed 1,000 nm because, if the thickness exceeds 1,000 nm, it takes much time to form the functional layer 12, and deterioration of the characteristics and peeling of the functional layer 12 tend to be generated by the stress of the functional layer 12. On the other hand, it is undesirable for the thickness of the functional layer 12 to be 0.1 nm or less because it is substantially impossible to form such a thin film.

Also, it is desirable for the functional layer 12 to be formed of a magnetic semiconductor material exhibiting a light-induced ferromagnetism upon irradiation with a laser beam having an output of about scores of milliwatts or less.

The recording layer 11 is stacked on the functional layer 12 in a manner to produce exchange coupling interaction with the functional layer 12. The recording layer 11 contains magnetic particles having a magnetic anisotropy energy density $Ku_{RL}$ higher than the magnetic anisotropy energy density $Ku_{FL}$ of the functional layer 12 and a nonmagnetic material interposed between the magnetic particles.

A material having relatively high saturation magnetization Is and high magnetic anisotropy is adapted for use as the material of the magnetic particles contained in the recording layer 11. In this viewpoint, alloys containing a metal selected from the group consisting of, for example, Co, Pt, Sm, Fe, Ni, Cr, Mn, Bi and Al are used as the magnetic metal material. Among these alloys, it is more desirable to use a Co-based alloy having high crystalline magnetic anisotropy, in particular, such as alloys based on CoPt, SmCo or CoCr, or an ordered alloy such as FePt or CoPt. To be more specific, the alloys used as the magnetic metal material in the present invention include, for example, CoCr, CoPt, CoCrTa, CoCrPt, CoCrTaPt, $Fe_{50}Pt_{50}$, $Fe_{50}Pd_{50}$, and $Co_3Pt_1$.

It is also possible to use an alloy of a rare earth metal and a transition metal such as TbFe, TbFeCo, TbCo, GdTbFeCo, GdDyFeCo, NdFeCo or NdTbFeCo as a material of the magnetic particles contained in the recording layer 11. It is also possible to use a multi-layered film including a magnetic layer and a nonmetal layer such as Co/Pt or Co/Pd, a semimetal such as PtMnSb, or a magnetic oxide such as Co ferrite or a Ba ferrite as a material of the magnetic particles contained in the recording layer 11.

It is also possible to prepare an alloy by adding at least one element selected from the group consisting of Fe and Ni to the magnetic materials noted above in order to control the magnetic characteristics of the magnetic particles contained in the recording layer 11. Further, it is possible to add a material, serving to improve the magnetic characteristics, such as an element selected from the group consisting of, for example, Cr, Nb, V, Ta, Ti, W, Hf, Cr, V, In, Si, and B to the metals or alloys noted above. Still further, it is possible to add a compound of the additive element noted above with an element selected from the group consisting of oxygen, nitrogen, carbon and hydrogen to the alloys noted above.

It is possible for the magnetic anisotropy of the magnetic recording layer to be any of an in-plane magnetic anisotropy, a perpendicular magnetic anisotropy and a mixed anisotropy thereof.

The thickness of the recording layer 11 is not particularly limited. However, in order to realize a high-density recording, it is desirable for the thickness of the recording layer 11 to be 100 nm or less, more desirably 50 nm or less, and furthermore desirably 20 nm or less. It should be noted, however, that it is undesirable for the thickness of the recording layer 11 to be smaller than 0.5 nm because it is difficult to form such a thin film.

In order to separate the magnetic particles by forming a nonmagnetic material among the magnetic particles contained in the recording layer 11, it is possible to precipitate a nonmagnetic element such as Cr, Ta or B, an oxide represented by $SiO_2$, or a nitride represented by $Si_3N_4$ among the magnetic particles. It is also possible to form a nonmagnetic material among the magnetic particles by a process utilizing the lithography technology. It is also possible to form a nonmagnetic material among the magnetic particles by the self-ordering process utilizing a self-ordering diblock copolymer such as PS-PMMA as a mask. Further, it is possible to form a nonmagnetic material among the magnetic particles by the processing that utilizes, for example, a particle beam irradiation.

The exchange coupling interaction between the functional layer 12 and the recording layer 11 can be realized by forming the functional layer 12 in the general process of preparing a medium by, for example, a sputtering method, followed by forming the recording layer 11 without breaking the vacuum.

Even if the functional layer 12 and the recording layer 11 are away from each other by about several nanometers, the exchange coupling interaction can theoretically be produced. Therefore, it is acceptable for a nonmagnetic layer or a surface-modified region to be present between the functional layer 12 and the recording layer 11, as far as the exchange coupling interaction can be produced.

It should also be noted that, since the exchange coupling force can be controlled by interposing another magnetic layer between the functional layer 12 and the recording layer 11, it is also acceptable for a single magnetic layer or a plurality of magnetic layers to be present between the functional layer 12 and the recording layer 11 as far as the function of the present invention is not impaired.

It is possible to form the protective layer 14, as required, on the surface of the magnetic recording medium. It is possible to use a thin film of carbon or $SiO_2$ as the protective layer 14.

It is possible to form an underlayer between the substrate 13 and the functional layer 12 or the recording layer 11. By forming the underlayer, it is possible to control the characteristics of the functional layer 12 or the recording layer 11. The thickness of the underlayer, which is not particularly limited, should desirably be 500 nm or less, since the manufacturing cost is increased with increase in the thickness of the underlayer.

In the case of using an underlayer formed of a magnetic material, the recording and reproducing can be performed efficiently by allowing the underlayer to be magnetically coupled with the domains of the recording layer 11 or the writing-reading head by means of exchange coupling interaction or magnetostatic interaction. Where, for example, a perpendicular magnetization film is used for the recording layer 11, a high-density recording can be performed by forming a soft magnetic film as the underlayer and by writing with a head of a single magnetic pole.

Also, where a longitudinal magnetization film is used for the recording layer 11, a high-density recording can be performed by forming a soft magnetic layer above or below the recording layer 11 and by applying a magnetic field having intensity high enough to saturate the soft magnetic layer in the reproducing stage. In this case, the resistance to the thermal fluctuation can also be improved.

Also, it is possible to form an underlayer of a nonmagnetic material in order to control the crystalline structure of the magnetic portion or the nonmagnetic portion or in order to prevent the mixing of an impurity from the substrate. For example, it is possible to control the crystalline state of the magnetic portion in the case of using an underlayer having lattice spacing close to that of the magnetic portion.

It is also possible to control the crystallinity or amorphous state of the magnetic portion or the nonmagnetic portion by using, for example, an amorphous underlayer having a degree of surface energy.

It is also possible form an additional underlayer below an underlayer. In this case, the two underlayers can shared the above functions. For example, it is possible to form a seed layer having a small particle size on the substrate 13 and to form on the seed layer an underlayer serving to control the crystallinity of the recording layer 11 in order to decrease the size of the crystal grains in the recording layer 11.

In order to prevent the mixing of an impurity from the substrate 13, it is possible to use a thin film having small lattice spacing or a thin film of a high density as an underlayer.

It is possible for the magnetic or nonmagnetic underlayer noted above to perform the both functions described above. For example, it is possible for the magnetic underlayer to control the crystallinity of the magnetic portion. In this case, the effect on the recording-reproducing characteristics is multiplied by the effect on the crystallinity, which is more desirable.

It is possible for the underlayer to be a surface-modified layer of the substrate formed by, for example, ion plating, doping within a surrounding gas or irradiation with a neutron beam. In this case, an additional process of depositing a thin film need not be employed for forming the underlayer, which brings about an advantage in manufacturing the magnetic recording medium.

A magnetic head 30 including a writing head 31 and a reading head 32 is arranged above the magnetic disk 101. It is possible to use as the writing head 31 a head having a magnetic circuit including an induction coil and a magnetic pole, which is used in the ordinary HDD. The magnetic pole is formed of, for example, Fe, NiFe or a Fe alloy. On the other hand, it is possible to use, for example, a giant magnetoresistive element (GMR element) that is disposed between two magnetic shields as the reading head 32.

It is possible to use a permanent magnet as the writing head 31. In the case of using a permanent magnet, it is possible to realize a high-speed application of a magnetic field and a high-density recording by, for example, making the distance between the writing head 31 and the magnetic recording medium variable or by miniaturizing the magnet. It is also possible to add a magnetic layer to the magnetic recording medium so as to generate magnetization distribution by temperature distribution or light irradiation, or to utilize a stray magnetic field generated from the recording layer itself.

A laser 40 is arranged as a light source that irradiates the functional layer 12 with light in the position facing to the writing head 31 with the magnetic disk 101 interposed therebetween. It is possible for the laser beam to be converged by a lens so as to permit the functional layer 12 to be locally irradiated with light. It is also possible to convert the laser beam into a near field light by using a fine aperture or a solid immersion lens. It is possible to arrange the light source that irradiates the functional layer 12 with light above the magnetic disk 101 together with the magnetic head 30.

In the magnetic disk apparatus of the construction described above, recording or reproducing is performed as follows. Specifically, recording is performed by applying a magnetic field from the writing head 31 to the recording layer 11 while irradiating the functional layer 12 with light. On the other hand, reproducing is performed by detecting a leakage magnetic field from the magnetic recording medium 101 by means of the reading head 32 having the GMR element. Since the recorded information can be read without employing the light irradiation, it is possible to ensure compatibility with the conventional reproducing system.

It is possible to measure the magnetic characteristics (magnetization M or coercivity Hc) when the light irradiation is performed and is not performed with a vibrating sample magnetometer (VSM) in respect of the functional layer 12 alone and an exchange-coupled film of the functional layer 12 and the recording layer 11.

FIGS. 3A to 3D collectively show the changes in the magnetization of the recording layer 11 and the functional layer 12 relative to light irradiation in the magnetic disk apparatus according to the first embodiment of the present invention. Specifically, FIG. 3A shows the state of the magnetization before the light irradiation. FIG. 3B shows the state of the magnetization during the light irradiation. FIG. 3C shows the state of the magnetization during the recording. Further, FIG. 3D shows the state of the magnetization after the light irradiation.

The cross sections of the functional layer 12 and the recording layer 11 included in the magnetic recording medium 101 are shown in FIGS. 3A to 3D. The recording layer 11 is constructed such that magnetic particles 21 are separated by a nonmagnetic material 22. The arrow in the magnetic particles 21 denotes the direction of the magnetization, and the length of the arrow schematically denotes the magnitude of the coercivity. FIGS. 3A to 3D show that the functional layer 12 is also constructed such that the magnetic particles are separated by the nonmagnetic material as in the recording layer 11. It should be noted, however, that it is possible for the construction of the functional layer 12 to be of another form such as a continuous film or a three dimensional granular structure. FIGS. 3A to 3D are directed to a perpendicular magnetic recording medium. However, the following description can be applied as it is to a longitudinal magnetic recording medium, too.

The recording layer 11 has a high magnetic anisotropy energy density $Ku_{RL}$, and the coercivity of the recording layer 11 is higher than the magnetic field generated from the writing head 31. Therefore, writing to the recording layer 11 alone cannot be performed.

In the initial state before light irradiation and before application of a magnetic field, all the magnetic particles 21 contained in the recording layer 11 are assumed to be magnetized upward, as shown in FIG. 3A. At that time, the recording layer 11 has a magnetic anisotropy energy density $Ku_{RL}$. The functional layer 12 is not irradiated with light and, thus, is not magnetized. Under this state, recording cannot be performed under the magnetic field generated from the writing head 31 because the recording layer 11 has a sufficiently high coercivity as described above. However, the magnetization is not lost by the thermal fluctuation.

In the next step, a region 24 is irradiated with light emitted from the laser 40, with the result that the functional layer 12 is magnetized by the light irradiation, as shown in FIG. 3B. In this stage, the functional layer 12 exhibits a magnetic anisotropy energy density $Ku_{FL}$, which is lower than the magnetic anisotropy energy density $Ku_{RL}$ inherent in the recording layer 11. However, exchange coupling interaction is exerted between the functional layer 12 and the recording layer 11 so as to lower the magnetic anisotropy energy density of the recording layer 11 to a value intermediate between $Ku_{RL}$ and $Ku_{FL}$.

Then, a downward magnetic field is applied from the writing head 31. In this stage, the magnetic anisotropy energy density of the recording layer 11 is lowered as described above, and the coercivity of the recording layer 11 is lowered to such an extent as to permit recording under the magnetic field generated from the writing head 31. As a result, the magnetization of each of the recording layer 11 and the functional layer 12 is reversed downward simultaneously so as to form a downwardly magnetized recording domain in the region 24, as shown in FIG. 3C.

If the region 24 ceases to be irradiated with light in the next step, the magnetization of the functional layer 12 is lost, and exchange coupling interaction ceases to be exerted between the recording layer 11 and the functional layer 12, as shown in FIG. 3D. As a result, the coercivity of the recording layer 11 is brought back to the original high value, thereby preventing loss of the magnetization due to thermal fluctuation.

Figure 4:
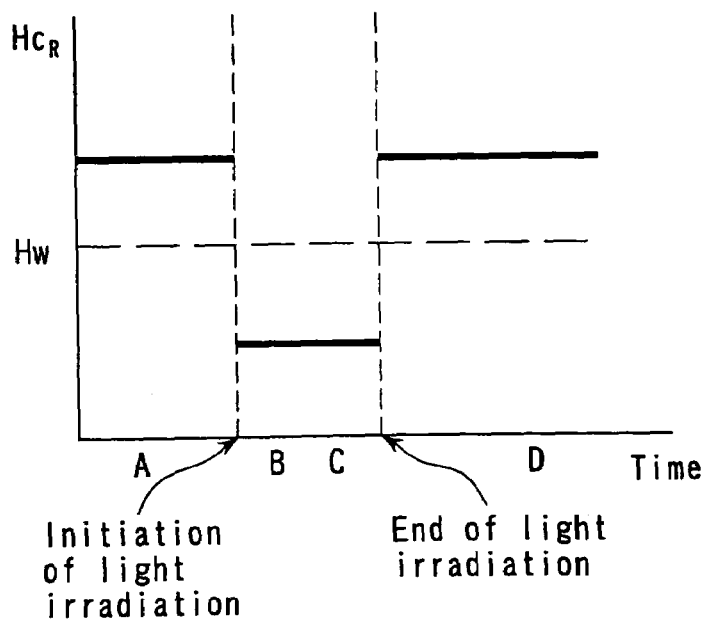
FIG. 4 shows the change in coercivity of the recording layer included in the magnetic disk apparatus according to one embodiment of the present invention.

FIG. 4 is a graph showing the changes with time, which is shown in FIGS. 3A to 3D, in coercivity $Hc_R$ of the recording layer 11.

As shown in FIG. 4, the coercivity $Hc_R$ of the recording layer 11 is higher than the writing magnetic field Hw of the writing head 31 before initiation of the light irradiation and after completion of the light irradiation. However, during the light irradiation, exchange coupling interaction is exerted between the functional layer 12 that has developed ferromagnetism and the recording layer 11, with the result that the coercivity $Hc_R$ of the recording layer 11 is rendered smaller than the writing magnetic field Hw of the writing head 31. It follows that it is possible to write information into the recording layer 11 by applying the magnetic field generated from the writing head 31 while irradiating the functional layer 12 with light. Also, since the recording layer 11 recovers inherent high coercivity thereof by stopping the light irradiation after the writing of the information, it is possible to overcome the problem of the thermal fluctuation, which has been a serious problem in high-density magnetic recording.

As described above, the magnetic anisotropy energy density $Ku_{FL}$ of the functional layer 12 is set lower than the magnetic anisotropy energy density $Ku_{RL}$ of the recording layer 11. However, the difference between $Ku_{FL}$ and $Ku_{RL}$ is not particularly limited. If the difference noted above is small, the effect of lowering the coercivity Hc of the recording layer 11 is small. However, it is possible to obtain a high value of KuV, where V represents the volume of a magnetic domain, even if the thickness of the functional layer 12 is small. On the other hand, if the difference between $Ku_{FL}$ and $Ku_{RL}$ is large, the effect of decreasing the coercivity Hc of the recording layer 11 is increased. However, it is difficult to obtain the conditions for reversing the magnetization of the recording layer 11 and the functional layer 12 simultaneously, unless the thickness of the functional layer 12 is increased. It follows that the difference between $Ku_{RL}$ and $Ku_{FL}$ is determined in accordance with the magnetic recording-reproducing system.

In general, it is desirable for the value of $Ku_{RL}/Ku_{FL}$ to be 3 or more, more desirably 5 or more, and most desirably 10 or more.

An example of the magnetic disk apparatus having the construction as shown in FIG. 2 will now be described.

In the first step, and underlayer (not shown) made of ZnO and having a thickness of about 50 nm is formed on the glass substrate 13 having a diameter of 2.5 inches, followed by forming the functional layer 12 made of ZnO added with Cr and having a thickness of about 25 nm on the underlayer. Then, the recording layer 11 made of CoCrPt—O and having a thickness of about 20 nm is formed on the functional layer 12, followed by forming the protective layer 14 made of carbon and having a thickness of about 3 nm on the recording layer 11. Each of underlayer, the functional layer 12, the recording layer 11 and the protective layer 14 is formed by sputtering. Further, the protective layer 14 is coated with a lubricant.

The fine structure of the recording layer 11 is examined by a transmission electron microscope (TEM). It has been found that, in the recording layer 11, columnar magnetic crystal grains made of CoPtCr and having a size of about 7 nm are separated by a nonmagnetic material made of amorphous Co—O and a trace of Cr.

Concerning the magnetic characteristics, the recording layer 11 alone is found to have an easy axis of magnetization in a longitudinal direction, and the coercivity at room temperature measured by VSM is estimated at about 5 kOe. It is impossible to measure accurately the Curie temperature of the recording layer 11 because of the plastic deformation of the film structure under high temperatures. However, the Curie temperature is estimated at about 300° C. based on the extrapolation from the temperature dependency of the magnetic characteristics up to 200° C. Also, the influence of thermal fluctuation is estimated to be increased because the magnetic crystal grains contained in the recording layer 11 had a small grain size.

When the measurement by VSM is performed while irradiating the stacked film of the functional layer 12 and the recording layer 11 with light, decrease in coercivity is observed.

Figure 5:
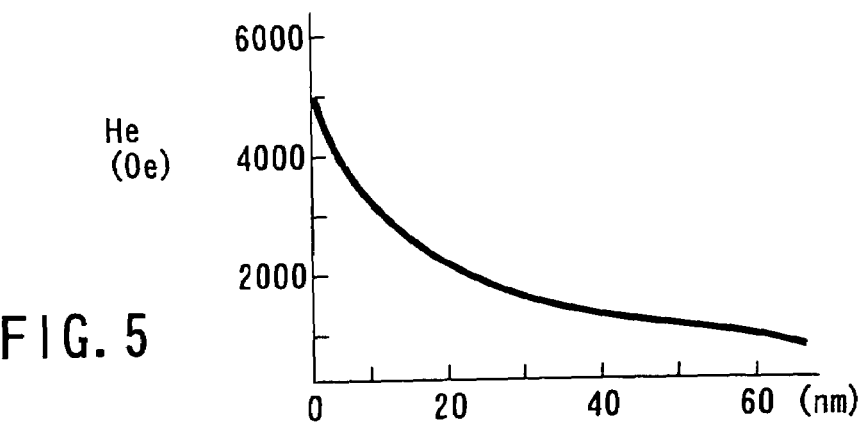
FIG. 5 is a graph showing a relationship between the coercivity of the recording layer and the thickness of the functional layer in the magnetic disk apparatus according to one embodiment of the present invention.

Various magnetic disk samples constructed as shown in FIG. 2 are prepared by changing in various fashions the thickness of the functional layer 12 made of Co-added ZnO, and the VSM measurement is performed while irradiating each disk sample with light. FIG. 5 is a graph showing the results. In the graph of FIG. 5, the horizontal axis represents the thickness (nm) of the functional layer 12, and the vertical axis represents the coercivity of the magnetic disk.

As shown in FIG. 5, the coercivity of the magnetic disk is lowered with increase in the thickness of the functional layer 12. In other words, the experimental data given in FIG. 5 supports that it is desirable for the functional layer 12 to be thicker in view of the writing magnetic field. However, it is undesirable for the functional layer 12 to be excessively thick in view of the manufacturing process of the magnetic disk. In the first embodiment of the present invention, the thickness of the functional layer 12 is set at about 25 nm in view of the fact that the writing magnetic field of the writing head 31 is about 2 kOe.

Then, dynamic characteristics of the magnetic disk are evaluated by a recording-reproducing evaluating apparatus of the HDD. The rotating speed of the magnetic disk is set at 4,500 rpm, the gap of the writing head is set at 200 nm, and the gap of the reading head using a GMR element is set at 110 nm. The magnetic spacing is estimated at about 30 nm from the calculation based on the flying height of the magnetic head and the thickness of the lubricant. A laser having a wavelength of 633 nm is used as a light source, and an external low floating lens is arranged between the laser and the back surface of the substrate 13. The external low floating lens and the substrate are designed to form collectively a solid immersion lens (SIL). The functional layer 12/recording layer 11 is irradiated with a laser beam passing through the external low floating lens and the substrate so as to be focused on the portion of the functional layer 12/recording layer 11. The spot size of the laser beam is about 500 nm in terms of FWHM. The head is precisely driven by a piezoelectric element so as to permit the irradiating position of the light to be coincident with the gap position of the writing head.

Figure 6:
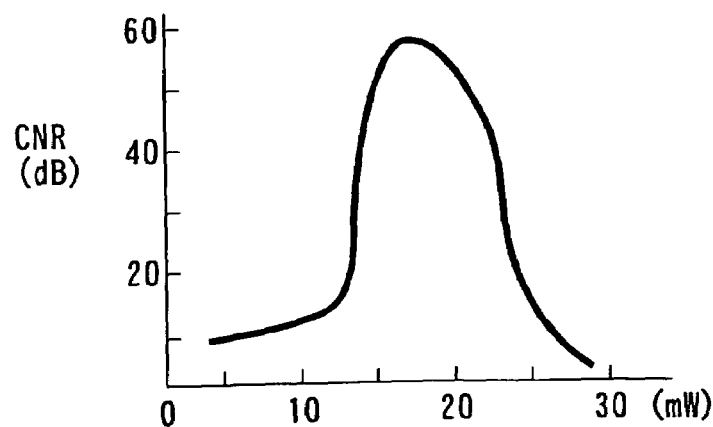
FIG. 6 is a graph showing the change in CNR of the magnetic disk relative to the light irradiation power in the magnetic disk apparatus according to one embodiment of the present invention.

First, the magnetic recording is attempted without laser beam irradiation. The read signals are found to be substantially noise, resulting in failure to perform sufficient writing of information. This is quite natural in view of the coercivity of the recording layer 12 and the writing magnetic field of the writing head 31. Then, the recording is performed while irradiating the disk with the laser beam. An additional experiment and a simulation are performed so as to look into in advance the relationship between the irradiating power of the laser beam and the magnetization of the functional layer 12. The CN ratio (CNR) of the read signals is examined by changing the irradiating laser power. FIG. 6 is a graph showing the result of the recording performed under a single frequency of 400 kfci.

As shown in FIG. 6, the CNR under the critical conditions capable of recording is about 10 dB, which is a value too low to be used in the actual HDD system. However, the experimental data sufficiently supports that the principle of the magnetic disk apparatus according to the first embodiment of the present invention is effective. It is possible to improve sufficiently the CNR value by lowering the recording frequency or by adjusting the magnetic characteristics of the magnetic recording medium.

EMBODIMENT 2

Figure 7:
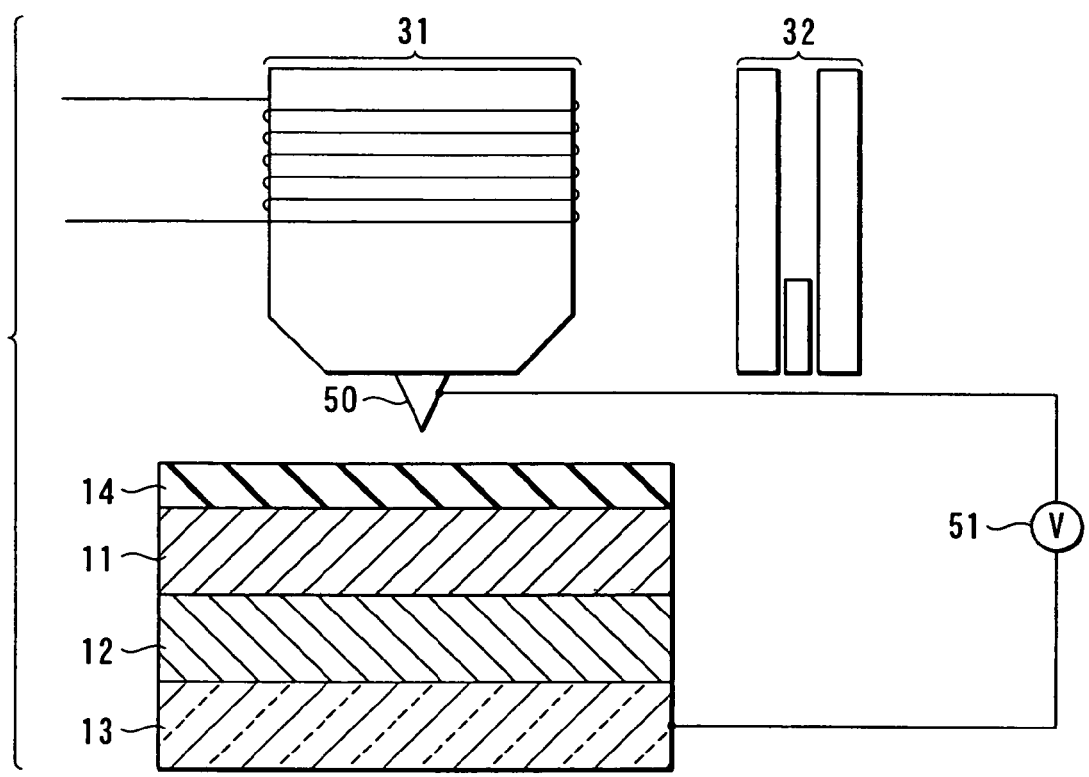
FIG. 7 is a cross sectional view showing an arrangement of the magnetic recording medium, the magnetic head and the probe which applies an electric field in the magnetic disk apparatus according to another embodiment of the present invention.

FIG. 7 is a cross sectional view showing the arrangement of the magnetic recording medium, the magnetic head and a probe that applies an electric field in the magnetic disk apparatus according to a second embodiment of the present invention.

As shown in FIG. 7, the magnetic disk 101 in the second embodiment of present invention includes a nonmagnetic substrate 13, a functional layer 12 formed on the nonmagnetic substrate 13 and consisting of an field-induced ferromagnetic material, a recording layer 11 formed on the functional layer 12, and a protective layer 14 formed on the recording layer 11. The stacking order of the functional layer 12 and the recording layer 11 is not particularly limited. It is possible to form the recording layer 11 on the nonmagnetic substrate 13 and to form the functional layer 12 on the recording layer 11.

The field-induced ferromagnetic material used for the functional layer 12 includes a semiconductor material containing In, Ga, Zn, Cd, Si or Ge. To be more specific, the material used for the functional layer 12 includes a magnetic semiconductor material prepared by adding a transition metal such as Ti, V, Cr, Mn, Fe, Co or Ni to a semiconductor material such as InAs, GaAs, ZnO, ZnSe or ZnTe. The materials for the other layers of the magnetic disk 101 may be equal to those described previously in conjunction with the first embodiment of the present invention.

A magnetic head 30 including a writing head 31 and a reading head 32 is arranged above the magnetic disk 101. Also, a probe 50 that applies an electric field is mounted to the tip of the writing head 31. The probe 50 is prepared by coating the surface of silicon processed in a conical shaped with gold (Au) and has a size of about 10 nm in the tip. When a voltage power source 51 is connected between the probe 50 and the substrate 13 and a voltage of about 10V is applied, a discharge current of 1 mA is observed.

FIGS. 8A to 8D collectively show the changes in the magnetization of the recording layer and the functional layer relative to an electric field application in the magnetic disk apparatus according to the second embodiment of the present invention. To be more specific, FIG. 8A shows the state before the electric field application. FIG. 8B shows the state during the electric field application. FIG. 8C shows the state during the recording. Further, FIG. 8D shows the state after the electric field application.

The recording layer 11 has a high magnetic anisotropy energy density $Ku_{RL}$, and the coercivity of the recording layer 11 is higher than the intensity of the magnetic field generated from the writing head. It follows that the recording cannot be performed to the recording layer 11 alone.

In the initial state before the electric field application and before application of the magnetization, all the magnetic particles 21 contained in the recording layer 11 are assumed to be magnetized upward, as shown in FIG. 8A. In this stage, the recording layer 11 has a magnetic anisotropy energy density $Ku_{RL}$ and the functional layer 12 is not magnetized because an electric field is not applied thereto. Under this state, recording cannot be performed under the magnetic field generated from the writing head 31 because the recording layer 11 has a sufficiently high coercivity as described above. However, the magnetization is not lost by the thermal fluctuation.

In the next step, an electric field is applied to a region 24 by the probe 50. By the electric field application, magnetization appears in the functional layer 12 as shown in FIG. 8B. In this stage, the functional layer 12 exhibits a magnetic anisotropy energy density $Ku_{FL}$, which is lower than the magnetic anisotropy energy density $Ku_{RL}$ inherent in the recording layer 11. However, exchange coupling interaction is exerted between the functional layer 12 and the recording layer 11, with the result that the magnetic anisotropy energy density of the recording layer 11 is lowered to a value intermediate between $Ku_{RL}$ and $Ku_{FL}$.

Then, a downward magnetic field is applied from the writing head 31. At that time, the magnetic anisotropy energy density of the recording layer 11 is lowered as described above, and the coercivity of the recording layer 11 is lowered to a level at which the recording can be performed under the magnetic field generated from the writing head 31. As a result, the magnetization of each of the recording layer 11 and the functional layer 12 is reversed downward simultaneously so as to form a downwardly magnetized recording domain in the region 24, as shown in FIG. 8C.

If the electric field application to the region 24 is stopped in the next step, the magnetization of the functional layer 12 is erased and the exchange coupling interaction ceases to be exerted between the recording layer 11 and the functional layer 12, as shown in FIG. 8D. As a result, the coercivity of the recording layer 11 is brought back to its inherent high value, thereby preventing the erasure of the magnetization caused by thermal fluctuation.

The magnetic disk apparatus constructed as shown in FIG. 7 is actually prepared as follows.

Specifically, a MgO underlayer (not shown) having a thickness of about 50 nm, a GaAsMn functional layer 12 having a thickness of about 20 nm, a FePtAg recording layer 13 having a thickness of about 25 nm, and a carbon protective layer 14 having a thickness of about 3 nm are successively formed in the order mentioned on a glass substrate having a diameter of 2.5 inches by sputtering, followed by coating the protective layer 14 with a lubricant.

The fine structure of the recording layer 11 is examined by using a TEM. It has been found that, in the recording layer 11, columnar magnetic crystal grains having a size of about 7 nm, which are made of FePt, are separated by a nonmagnetic portion formed of a trace of Ag.

Concerning the magnetic characteristics, the recording layer 11 alone is found to have an easy axis of magnetization in the perpendicular direction, and the coercivity Hc at room temperature measured by VSM is estimated at about 15 kOe. The magnetic anisotropy energy density $Ku_{RL}$, which is measured by using a magnetic torque meter, is found to be about $5 \times 10^7$ erg/cc. Also, the thermal fluctuation stability index KuV/kbT is found to be about 400, supporting a sufficient thermal stability.

The magnetic characteristics of the magnetic recording medium described above are evaluated by using a VSM apparatus. To be more specific, when an MH curve is measured under room temperature without applying an electric field, obtained is an MH curve substantially equal to that in the case of the recording layer alone.

Then, a voltage of about 10V is applied between the probe 50 and the substrate 13, and an MH curve of the magnetic recording medium is measured while applying an electric field. As a result, the coercivity is lowered to about 3 kOe, and it is possible to obtain a magnetic recording medium capable of writing under the magnetic field generated from the ordinary writing head. It should be noted in this connection that the functional layer is converted into a ferromagnetic layer having a low coercivity by the electric field application, and the coercivity of the recording layer is lowered by exchange coupling exerted between the functional layer and the recording layer, leading to the result described above.

Further, the MH curve is measured again by removing the electric field, thereby obtaining again an MH curve similar to the MH curve of the recording layer alone. The experimental data clearly supports that the coercivity of the recording layer is lowered during application of an electric field so as to make it possible for the writing head to write to the recording layer.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording-reproducing apparatus, comprising:

a magnetic recording medium comprising a nonmagnetic substrate, and a functional layer and a recording layer formed on the nonmagnetic substrate, the recording layer exhibiting a magnetic anisotropy energy density expressed by $Ku_{RL}$, the functional layer being formed of a magnetic semiconductor material comprising a semiconductor material selected from the group consisting of InAs, GaAs, ZnO, ZnSe, and ZnTe and at least one additive element selected from the group consisting of Ti, V, Cr, Mn, Fe, Co, and Ni, the functional layer having no magnetization without irradiation with light, and developing ferromagnetism upon irradiation with light so as to exhibit a magnetic anisotropy energy density expressed by $Ku_{FL}$ lower than the $Ku_{RL}$;

a light source which irradiates the functional layer with light; and a magnetic head comprising a writing head writing signal magnetization by applying a magnetic field to the recording layer and a reading head reading the signal magnetization recorded in the recording layer.

2. The magnetic recording-reproducing apparatus according to claim 1, wherein the recording layer contains magnetic particles and a nonmagnetic material interposed between the magnetic particles.

3. The magnetic recording-reproducing apparatus according to claim 1, wherein the recording layer contains an alloy selected from the group consisting of a FePt alloy, a FePd alloy, a CoPt alloy and a CoPd alloy.

4. The magnetic recording-reproducing apparatus according to claim 1, wherein a coercivity of the recording layer exhibiting the magnetic anisotropy energy density $Ku_{FL}$ is higher than a writing magnetic field of the writing head.

5. The magnetic recording-reproducing apparatus according to claim 1, wherein the value of $Ku_{RL}/Ku_{FL}$ is not smaller than 3.

6. The magnetic recording-reproducing apparatus according to claim 1, wherein the functional layer is formed on the nonmagnetic substrate and the recording layer is formed on the functional layer.

7. The magnetic recording-reproducing apparatus according to claim 1, wherein the recording layer is formed on the nonmagnetic substrate and the functional layer is formed on the recording layer.

8. A magnetic recording-reproducing apparatus, comprising:

a magnetic recording medium including a nonmagnetic substrate, a functional layer and a recording layer formed on the nonmagnetic substrate, the recording layer exhibiting a magnetic anisotropy energy density expressed by $Ku_{RL}$, the functional layer being formed of a magnetic semiconductor material comprising a semiconductor material selected from the group consisting of InAs, GaAs, ZnO, ZnSe, and ZnTe and at least one additive element selected from the group consisting of Ti, V, Cr, Mn, Fe, Co, and Ni, the functional layer having no magnetization without application of an electric field, and developing ferromagnetism upon application of an electric field so as to exhibit a magnetic anisotropy energy density expressed by $Ku_{FL}$ lower than the $Ku_{RL}$, and the functional layer serving to lower the magnetic anisotropy energy density of the recording layer through exchange coupling interaction with the recording layer when an electric field is applied to the functional layer;

a probe which applies an electric field to the functional layer; and a magnetic head comprising a writing head writing signal magnetization by applying a magnetic field to the recording layer and a reading head reading the signal magnetization recorded in the recording layer.

9. The magnetic recording-reproducing apparatus according to claim 8, wherein the recording layer contains magnetic particles and a nonmagnetic material interposed between the magnetic particles.

10. The magnetic recording-reproducing apparatus according to claim 8, wherein the recording layer contains an alloy selected from the group consisting of a FePt alloy, a FePd alloy, a CoPt alloy and a CoPd alloy.

11. The magnetic recording-reproducing apparatus according to claim 8, wherein a coercivity of the recording layer exhibiting the magnetic anisotropy energy density $Ku_{FL}$ is higher than a writing magnetic field of the writing head.

12. The magnetic recording-reproducing apparatus according to claim 8, wherein the value of $Ku_{RL}/Ku_{FL}$ is not smaller than 3.

13. The magnetic recording-reproducing apparatus according to claim 8, wherein the functional layer is formed on the nonmagnetic substrate and the recording layer is formed on the functional layer.

14. The magnetic recording-reproducing apparatus according to claim 8, wherein the recording layer is formed on the nonmagnetic substrate and the functional layer is formed on the recording layer.

* * * * *